(12) United States Patent
Yamada et al.

(10) Patent No.: US 9,151,098 B2
(45) Date of Patent: Oct. 6, 2015

(54) VEHICLE DOOR OPENING/CLOSING DEVICE

(71) Applicant: AISIN SEIKI KABUSHIKI KAISHA, Kariya-shi (JP)

(72) Inventors: Katsuhisa Yamada, Toyota (JP); Tetsuya Ikeda, Kariya (JP); Masayuki Uchitsunemi, Chiryu (JP); Taisuke Yamamoto, Nagoya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/378,238

(22) PCT Filed: Feb. 20, 2013

(86) PCT No.: PCT/JP2013/054193
§ 371 (c)(1),
(2) Date: Aug. 12, 2014

(87) PCT Pub. No.: WO2013/129206
PCT Pub. Date: Sep. 6, 2013

(65) Prior Publication Data
US 2015/0033503 A1 Feb. 5, 2015

(30) Foreign Application Priority Data

Mar. 1, 2012 (JP) ................................ 2012-045709

(51) Int. Cl.
*E05F 11/00* (2006.01)
*E05D 15/06* (2006.01)
(Continued)

(52) U.S. Cl.
CPC ............. *E05D 15/0621* (2013.01); *B60J 5/047* (2013.01); *B60J 5/0468* (2013.01); *B60J 5/06* (2013.01);
(Continued)

(58) Field of Classification Search
CPC ............ E05D 15/0621; E05D 15/1047; E05D 2015/1055; E05D 2015/1057; B60J 5/047; B60J 5/0468; B60J 5/06; E05F 15/646

USPC ............................................ 49/360; 296/155
See application file for complete search history.

(56) References Cited

U.S. PATENT DOCUMENTS 7,287,805 B2 * 10/2007 Yamada et al. ............... 296/155
8,225,552 B2 *  7/2012 Yokomori et al. .............. 49/360
(Continued)

FOREIGN PATENT DOCUMENTS

JP           5-61432 B2    9/1993
JP        2004-257174 A    9/2004
(Continued)

OTHER PUBLICATIONS

International Search Report (PCT/ISA/210) mailed on Jun. 4, 2013, by the Japanese Patent Office as the International Searching Authority for International Application No. PCT/JP2013/054193.
(Continued)

*Primary Examiner* — Jerry Redman
(74) *Attorney, Agent, or Firm* — Buchanan Ingersoll & Rooney PC

(57) ABSTRACT

A front cable and a rear cable are wound about a drum, are made to change direction by being caught onto a front pulley and a rear pulley, respectively, disposed on a center rail, and are respectively connected to a guide roller unit at respective terminals. The closing cable section of the front cable is routed to the outside of the center rail, the corresponding terminal being connected to the guide roller unit farther rearward than a load roller, and the opening cable section of the rear cable is routed to inside the center rail, the corresponding terminal being connected to the guide roller unit.

5 Claims, 7 Drawing Sheets

(51) Int. Cl.
  *B60J 5/06* (2006.01)
  *E05D 15/10* (2006.01)
  *E05F 15/646* (2015.01)
  *B60J 5/04* (2006.01)

(52) U.S. Cl.
  CPC .......... *E05D 15/1047* (2013.01); *E05F 15/646* (2015.01); *E05D 2015/1055* (2013.01); *E05Y 2201/654* (2013.01); *E05Y 2201/658* (2013.01); *E05Y 2900/531* (2013.01)

(56) References Cited

U.S. PATENT DOCUMENTS

| | | | | |
|---|---|---|---|---|
| 8,387,310 | B2* | 3/2013 | Robalo et al. | 49/360 |
| 2003/0005635 | A1* | 1/2003 | Haag et al. | 49/141 |
| 2003/0116995 | A1* | 6/2003 | Yogo et al. | 296/155 |
| 2004/0216383 | A1* | 11/2004 | Rogers et al. | 49/360 |
| 2004/0221510 | A1* | 11/2004 | Fukumoto et al. | 49/360 |
| 2004/0221511 | A1* | 11/2004 | Rogers et al. | 49/360 |
| 2006/0113821 | A1* | 6/2006 | Yokomori et al. | 296/155 |
| 2007/0108799 | A1 | 5/2007 | Yokomori et al. | |
| 2007/0194600 | A1* | 8/2007 | Oxley | 296/146.4 |
| 2009/0113801 | A1* | 5/2009 | Yokomori et al. | 49/352 |
| 2010/0154313 | A1* | 6/2010 | Elliott et al. | 49/360 |
| 2010/0319264 | A1* | 12/2010 | Takeda et al. | 49/363 |

FOREIGN PATENT DOCUMENTS

| | | |
|---|---|---|
| JP | 2007-270426 A | 10/2007 |
| JP | 2008-127830 A | 6/2008 |
| JP | 2008-128322 A | 6/2008 |
| JP | 4181079 B2 | 11/2008 |
| JP | 2010-105494 A | 5/2010 |

OTHER PUBLICATIONS

International Preliminary Report on Patentability (Form PCT/IB/373) and the Written Opinion of the International Searching Authority (Form PCT/ISA/237) issued on Sep. 2, 2014, by the International Bureau of WIPO in corresponding International Application No. PCT/JP2013/054193. (5 pages)

* cited by examiner

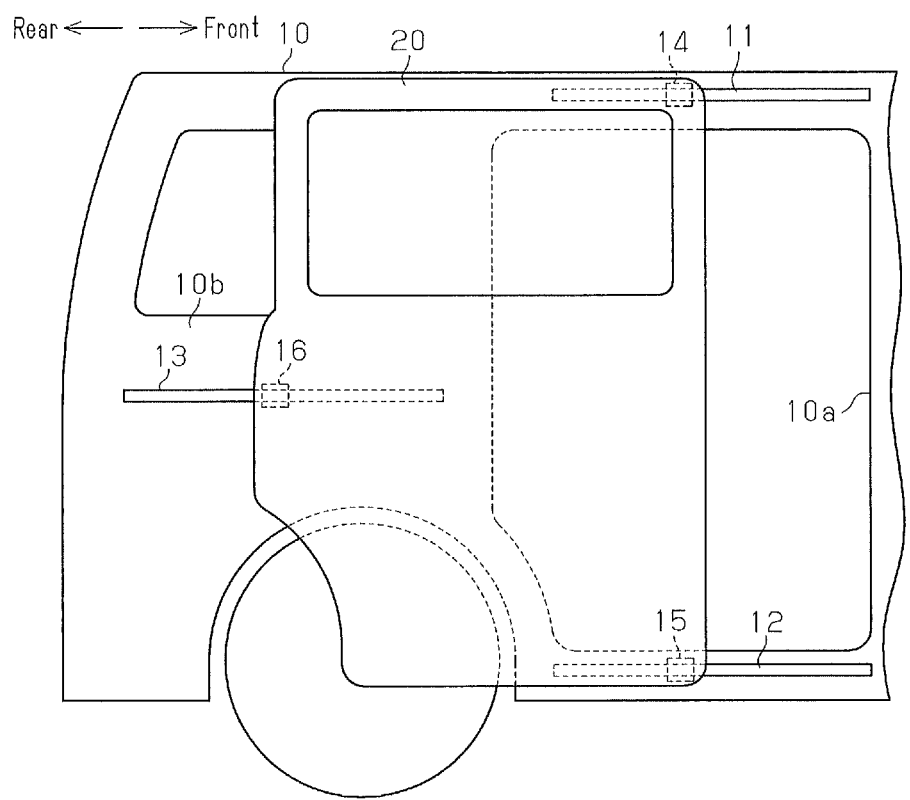

Open ←→ Close
Front-Rear Direction

VEHICLE DOOR OPENING/CLOSING DEVICE

BACKGROUND OF THE INVENTION

The present invention relates to a vehicle door opening/closing device that drives a vehicle door used to open and close a door opening formed in a vehicle body.

Patent document 1 describes an example of a vehicle door opening/closing device known in the prior art. As shown in FIG. 9, the vehicle door opening/closing device includes a guide rail 91, which is fixed to a side portion of a vehicle body, and a guide roller member 93, which is fixed to a vehicle door 92 and movably engaged with the guide rail 91. An electric motor 97 serving as a drive source is set on the vehicle body. The electric motor 97 rotates and drives a drum 96. A cable 95 is selectively wound around and unwound from the drum 96. The cable includes two ends 95a and 95b, each coupled to the guide roller member 93.

The cable 95, which extends from the drum 96 in the front-rear direction of the vehicle, runs around and between two pulleys 94a and 94b, which are located at the front side and the rear side of the guide rail 91. The two ends 95a and 95b are coupled to the guide roller member 93.

In such a conventional structure, when the drum 96 and the cable 95 transmits the drive force of the electric motor 97 to the guide roller member 93, the guide roller member 93 moves in the front-rear direction of the vehicle along the guide rail 91. The vehicle door 92 moves integrally with the guide roller member 93 and opens and closes the door opening.

Such a known vehicle door opening/closing device that is arranged on a quarter panel of a vehicle body is also known including a guide rail, an electric motor, a drum, a cable, and two pulleys (refer to patent document 2).

PRIOR ART DOCUMENTS

Patent Documents

Patent Document 1: Japanese Laid-Open Patent Publication No. 2008-128322
Patent Document 2: Japanese Laid-Open Patent Publication No. 2010-105494

SUMMARY OF THE INVENTION

In the vehicle door opening/closing device described in patent document 1, when moving the vehicle door 92 to a fully-closed position, the front end 95b of the cable 95 approaches the front pulley 94b together with the guide roller member 93. In particular, the end 95b of the cable 95 is further moved by a significant amount toward the front pulley 94b when the guide roller member 93 moves beyond its stroke toward the front due to the inertial force of the vehicle door 92. Accordingly, to avoid interference between the front pulley 94b and the front end 95b of the cable 95, the front pulley 94b needs to be separated toward the front from where the end 95b of the cable 95 is located at the fully-closed position of the vehicle door 92.

The front end of a guide rail usually lies along the movement path of a guide roller member in the vicinity of the fully-closed position of the vehicle door. The vehicle door is pushed toward the outer side in the vehicle widthwise direction immediately after the vehicle door starts to open from the fully-closed position or pulled toward the inner side in the vehicle widthwise direction immediately before the fully-closed position. Thus, the front end of the guide rail is curved and inclined toward the inner side in the vehicle widthwise direction (refer to patent document 2). Accordingly, at the fully-closed position of the vehicle door, the front pulley 94b, which is separated toward the front from the front end 95b of the cable 95, is arranged at the inner side in the vehicle widthwise direction in correspondence with the curve of the guide rail. In this case, in particular, the vehicle door opening/closing device in which the guide rail is arranged on the quarter panel of the vehicle body increases the amount of the area accommodating the front pulley that is bulged into the passenger compartment. This reduces the space in the passenger compartment and adversely affects the aesthetic appearance of the interior.

It is an object of the present invention to provide a vehicle door opening/closing device capable of obtaining a sufficient clearance between an end of a cable and a front pulley without increasing the amount bulged into the passenger compartment of the area accommodating components such as a front pulley and the like at the front side of the guide rail.

To solve the above problem, the present invention includes a guide rail configured to be arranged on a quarter panel at a rear side of a door opening formed in a side portion of a vehicle body. The guide rail is configured to extend in a front-rear direction and includes an inclined portion on a front end, and the inclined portion is inclined toward a vehicle interior. A guide roller member is configured to be coupled to a vehicle door that opens and closes the door opening. The guide roller member includes a roller that can roll on the guide rail. A drive member is configured to be fixed to the vehicle body. The drive member includes a drive source and a drum that is rotated and driven by the drive source. A front pulley and a rear pulley are located at a front side and a rear side of the guide rail. A cable is wound around the drum and runs along the front pulley and the rear pulley to change directions. The cable includes two ends that are each coupled to the guide roller member. A closing operation cable portion, which is a portion of the cable extending from the front pulley to the guide roller member, is located at an outer side of the guide rail, and a corresponding one of the ends is coupled to the guide roller member at the rear of the roller. An opening operation cable portion, which is a portion of the cable extending from the rear pulley to the guide roller member, is located in the guide rail, and a corresponding one of the ends is coupled to the guide roller member.

In the present invention, the closing operation cable portion of the cable is arranged at the outer side of the guide rail and includes an end that is coupled to the guide roller member at the rear of the roller. Accordingly, the end of the closing operation cable portion and the coupling portion in the guide roller member at the fully closed position are separated from the front pulley, which is arranged at the front of the end. Thus, a sufficient clearance between the end of the closing operation cable portion and the front pulley may be obtained without increasing the amount bulged into the passenger compartment of the area accommodating components such as a front pulley and the like at the front side of an inclined portion of the guide rail. Thus, the space in the passenger compartment is not reduced, and the aesthetic appearance of the interior is not adversely affected.

BRIEF DESCRIPTION OF THE DRAWINGS

FIG. 6 is a schematic view showing a vehicle such as an automobile to which the device of FIG. 1 is applied.

DETAILED DESCRIPTION OF THE PREFERRED EMBODIMENTS

Figure 1:
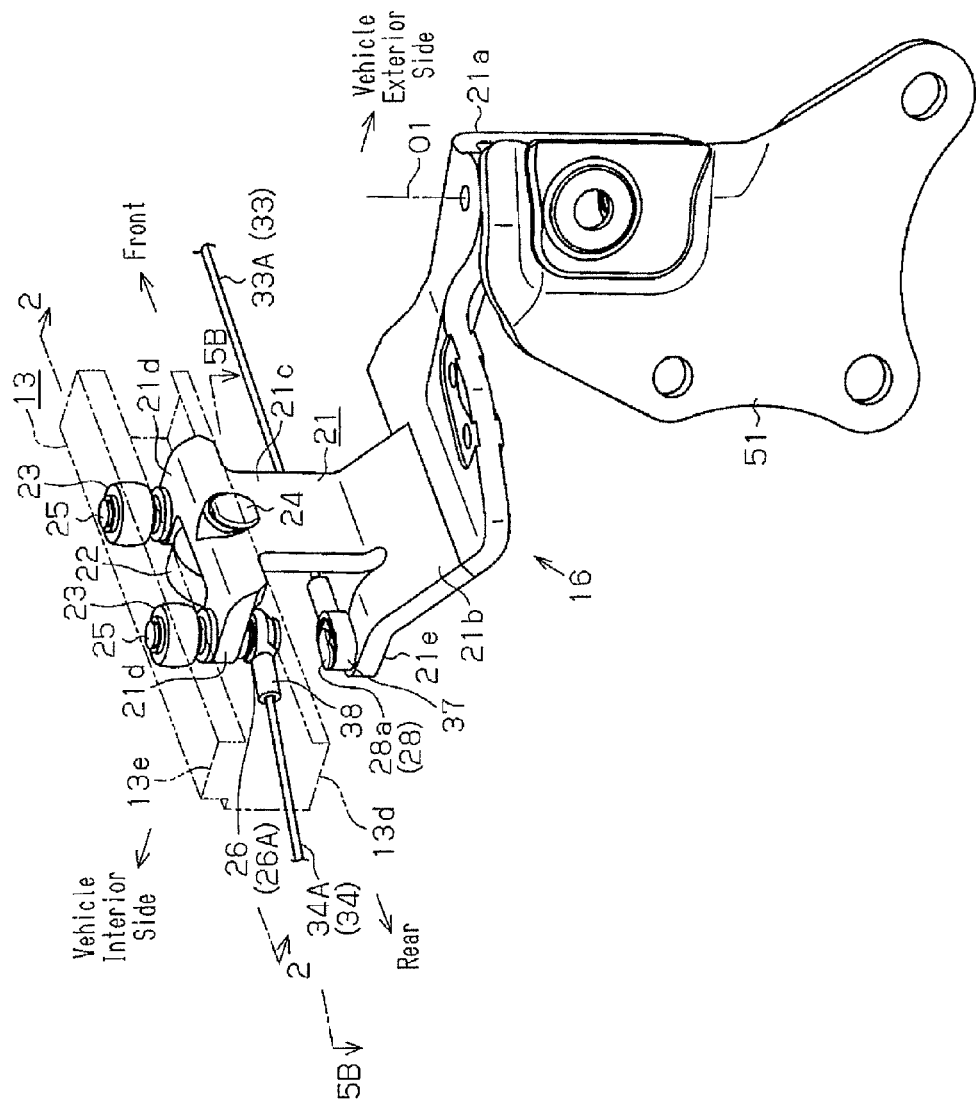
FIG. 1 is a perspective view showing a main portion of a vehicle door opening/closing device according to one embodiment of the present invention.

One embodiment of the present invention will now be described with reference to FIGS. 1 to 8. Hereinafter, the front-rear direction of the vehicle is referred to as "front-rear direction", and the upper side and the lower side in the vertical direction of the vehicle are respectively referred to as "upper side" and "lower side". The inner side in the vehicle widthwise direction toward the interior of the passenger compartment is referred to as the "vehicle interior side", and the outer side in the vehicle widthwise direction toward the exterior of the passenger compartment is referred to as the "vehicle exterior side".

As shown in FIG. 6, an upper rail 11 and a lower rail 12 extending in the front-rear direction are respectively set along an upper edge and a lower edge of a door opening 10a formed in a side portion of a vehicle body of the vehicle body 10. A center rail 13, which serves as a guide rail extending in the front-rear direction, is set on a quarter panel 10b at the rear of the door opening 10a. A sliding door 20, which serves as a vehicle door, is movably supported in the front-rear direction by the upper rail 11, the lower rail 12, and the center rail 13 with guide roller units 14 and 15 and a guide roller unit 16, which serves as a guide roller member. When moved in the front-rear direction to open and close the door opening 10a, the sliding door 20 moves the guide roller units 14 to 16 on the upper rail 11, the lower rail 12, and the center rail 13, respectively.

Figure 7:
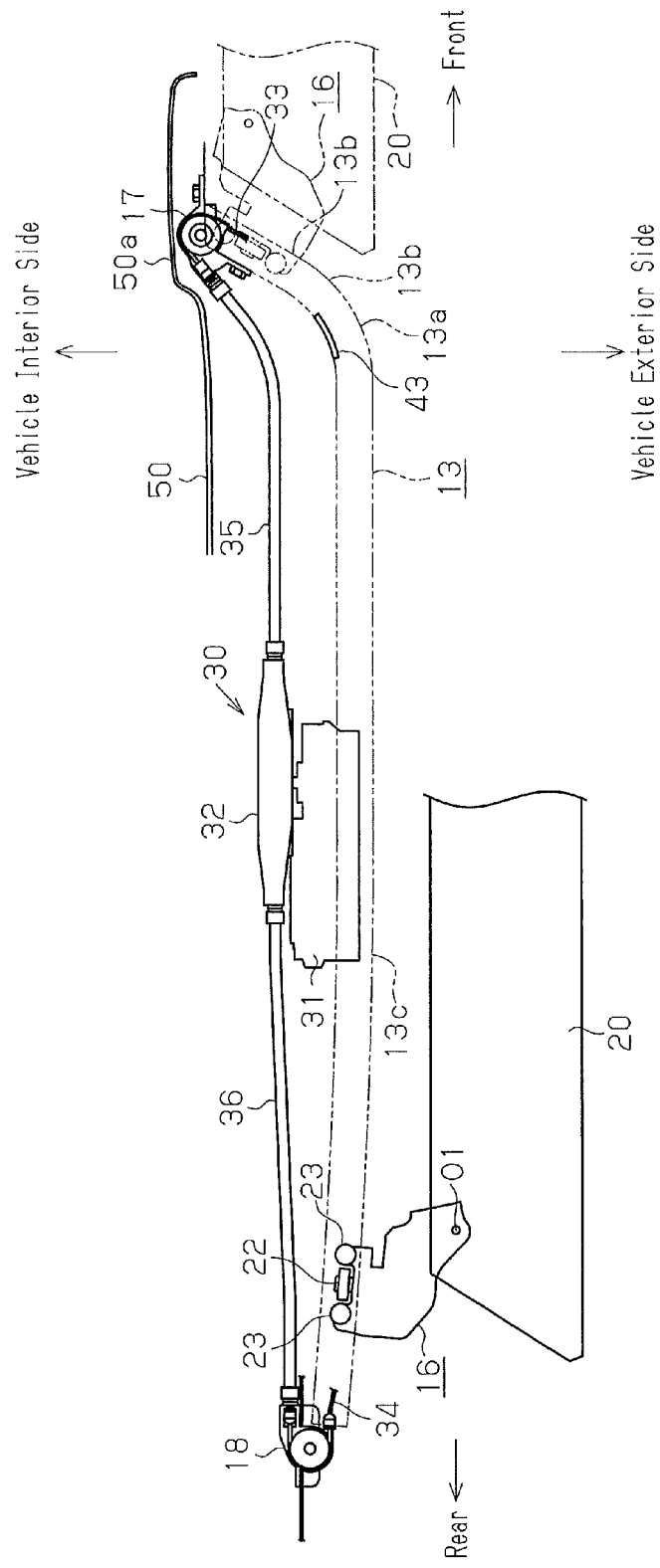
FIG. 7 is a plan view showing a sliding door arranged at a fully-closed position or a fully-open position.
Figure 8:
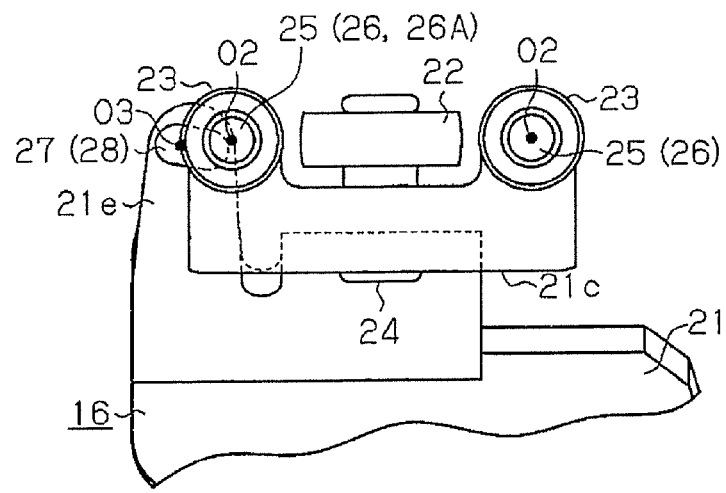
FIG. 8 is a partially enlarged view showing a guide roller unit.
Figure 9:
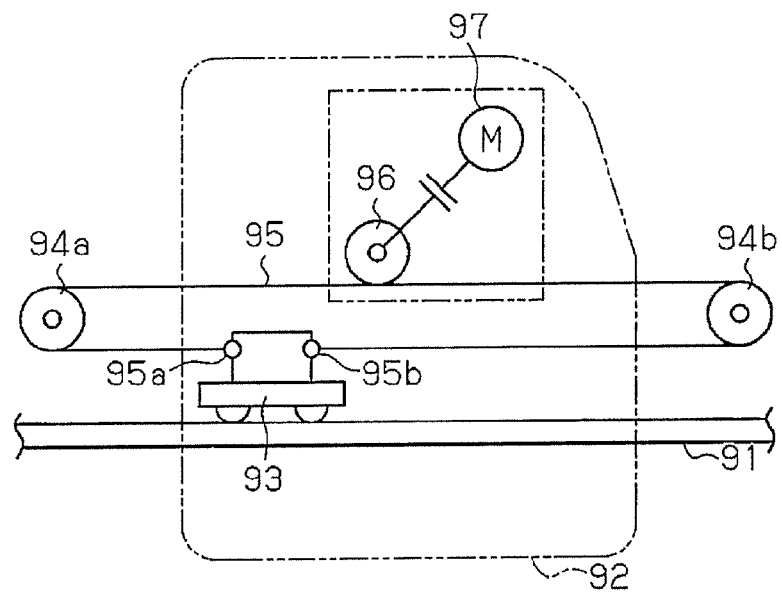
FIG. 9 is a schematic view showing a conventional structure.

The center rail 13 and the guide roller unit 16 will now be further described. As shown in FIG. 7, the center rail 13 is formed from, for example, a metal plate and includes a curved portion 13a at a longitudinally middle portion. The center rail 13 extends in the front-rear direction, that is, the opening and closing direction of the sliding door 20. The center rail 13 includes the curved portion 13a, an inclined portion 13b located at the front end, and a straight portion 13c. The inclined portion 13b is inclined toward the vehicle interior from the front end of the curved portion 13a, and the straight portion 13c extends toward the rear from the rear end of the curved portion 13a. A trimming, that is, a lining 50 that forms an ornamental surface of the vehicle body 10 in the passenger compartment includes a bulging portion 50a that bulges toward the vehicle interior in conformance with the front end of the inclined portion 13b of the center rail 13. The vehicle body 10 rotationally supports a front pulley 17, which is located proximate to the front end of the inclined portion 13b of the center rail 13, and rotationally supports a rear pulley 18, which opposes the rear end of the straight portion 13c of the center rail 13. The front pulley 17 and the rear pulley 18 each have an axis extending in the vertical direction of the vehicle.

A drive member 30 is fixed to the vehicle body 10 and located proximate to the center rail 13. The drive member 30 includes a drive motor 31, which serves as a drive source, and a drum 32, which is rotated and driven by the drive motor 31. A front cable 33 and a rear cable 34 are each wound around the drum 32 and each include an inner end fixed to the drum 32.

The front cable 33 extends toward the front through the interior of an outer tube 35, which is arranged between the drum 32 and the front pulley 17, and is then exposed from the outer tube 35 to the exterior. Further, the front cable 33 is directed toward the rear after running along the front pulley 17 and changing directions. The rear cable 34 extends toward the rear through the interior of an outer tube 36, which is arranged between the drum 32 and the rear pulley 18, and is then exposed from the outer tube 36 to the exterior. Further, the rear cable 34 is directed toward the front after running along the rear pulley 18 and changing directions.

Figure 2:
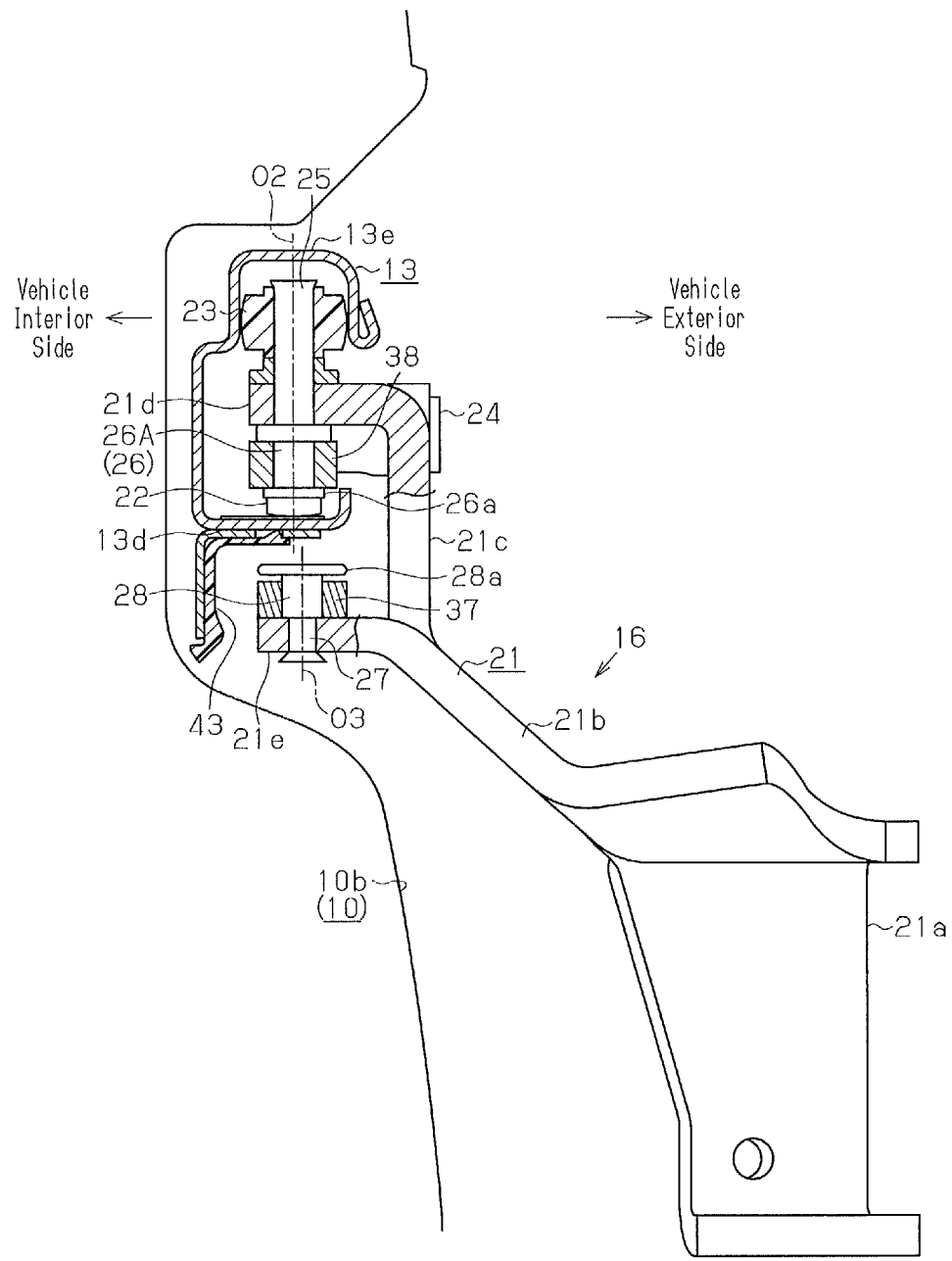
FIG. 2 is a cross-sectional view taken along the section line 2-2 in FIG. 1 and showing the main portion of the device of FIG. 1.

As shown in FIGS. 1 and 2, the center rail 13 has a substantially C-shaped cross-sectional shape that is open toward the vehicle exterior and the sliding door 20. The center rail 13 includes a lower wall portion that forms a first roller guide 13d and an upper wall portion of which distal section is downwardly bent to form a second roller guide 13e.

The guide roller unit 16 includes, for example, a base plate 21 formed by a metal plate, a load roller 22 and front and rear vertical rollers 23.

The base plate 21 is rotationally coupled to a bracket 51, which is fixed to the sliding door 20. The base plate 21 includes a coupling wall portion 21a, which is coupled to the bracket 51 pivotally about an axis O1 extending in the vertical direction of the vehicle, and an extended wall portion 21b, which extends from the upper end of the coupling wall portion 21a toward the center rail 13.

The base plate 21 includes a raised wall portion 21c, which rises from the front portion at the upper end of the extended wall portion 21b, and front and rear support pieces 21d, which are bent toward the vehicle interior side from the upper end of the raised wall portion 21c. The load roller 22 is supported by the upper end of the raised wall portion 21c. Further, the load roller 22 is axially supported by a support pin 24 extending along an axis intersecting the center rail 13. As shown in FIG. 2, the vertical rollers 23 are axially supported by the support pieces 21d. Specifically, each vertical roller 23 is supported by a support pin 25 that extends along an axis O2 in the vertical direction of the vehicle. The support pins 25 extend through the support pieces 21d in the vertical direction of the vehicle, and the upper portions of the support pins 25 support the vertical rollers 23. The lower ends of the support pins 25 that extend through the support pieces 21d form substantially circular rods 26 including substantially circular flanges 26a at the lower ends. In other words, the rods 26 are formed integrally with the support pins 25 and are coaxial with the vertical rollers 23.

The base plate 21 includes a support piece 21e extending from the rear side of the upper end of the extended wall portion 21b to the vehicle interior side below the center rail 13. A support pin 27 extending along an axis O3 in the vertical direction of the vehicle is attached to the support piece 21e. The upper end of the support pin 27 extends through the support piece 21e and forms a substantially circular rod-shaped front cable coupling portion 28 including a substantially oval-shaped flange 28a at the upper end. The longitudinal direction of the flange 28a substantially coincides with the longitudinal direction of the center rail 13, that is, the front-rear direction. As shown in the enlarged view of FIG. 8, the front cable coupling portion 28 is located proximate to the rear rod 26 (hereinafter also referred to as "rear cable coupling portion 26A") as viewed from above. More specifically, the front cable coupling portion 28 partially overlaps the rear cable coupling portion 26A as viewed from above.

Figure 5A:
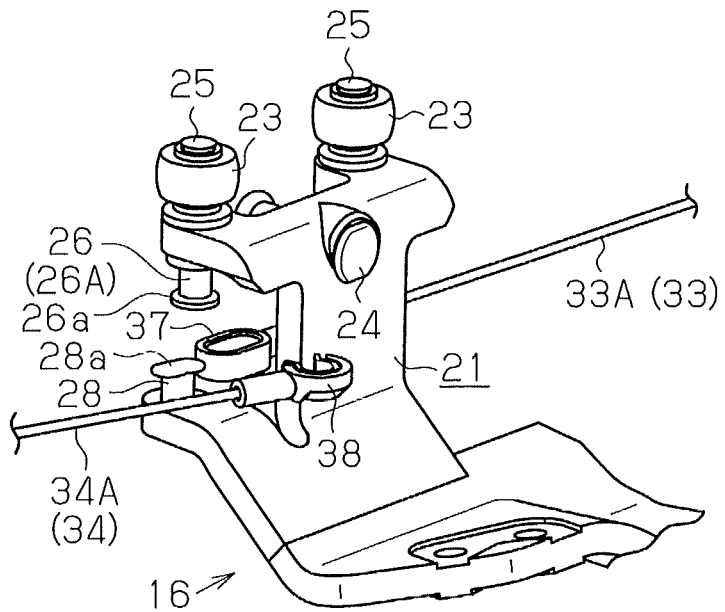
FIG. 5A is a perspective view showing the device of FIG. 1 in a coupled condition.

Referring to FIG. 1, the portion of the front cable 33 directed toward the rear after running along the front pulley 17 and changing directions toward the rear (hereinafter also referred to as "closing operation cable portion 33A") is located at the lower side and the outer side of the center rail 13, and the end 37 of the front cable 33 is coupled to the front cable coupling portion 28. More specifically, as shown in FIG. 5A, the end 37 has a substantially oblong tubular shape and an opening in the vertical direction of the vehicle to receive the flange 28a. When the front cable coupling portion 28 is received in the end 37, the end 37 is engaged with the flange 28a so that the end 37 cannot be separated from the flange 28a. In the closing operation cable portion 33A, tension is produced in the extending direction (front-rear direction) in the usage state after coupling the end 37. This restricts separation of the end 37 from the front cable coupling portion 28. The end 37 engaged with the front cable coupling portion 28 is located toward the rear of the load roller 22.

Figure 5B:
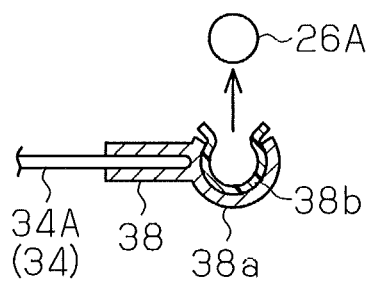
FIG. 5B is a cross-sectional view taken along the section line 5B-5B in FIG. 1 and showing the device of FIG. 1 in the coupled condition.

The portion of the rear cable 34 directed toward the front after running along the rear pulley 18 and changing directions (hereinafter referred to as "opening operation cable portion 34A") is located in the center rail 13, and the end 38 of the rear cable 34 is hooked to the rear cable coupling portion 26A. More specifically, as shown in FIG. 5B, the end 38 includes a substantially semicircular holder 38a, and a substantially Q-shaped separation stopper 38b, which is formed from a resin material and fitted into the holder 38a. The holder 38a and the separation stopper 38b both face the rear cable coupling portion 26A and are open toward the vehicle interior. When the end 38 is pushed against the rear cable coupling portion 26A in the open direction of the holder 38a, the separation stopper 38b is elastically deformed and widened. As a result, the rear cable coupling portion 26A is fitted to the separation stopper 38b, and the end 38 is hooked to the rear cable coupling portion 26A with the flange 26a restricting separation of the end 38. In the opening operation cable portion 34A, tension is produced in the extending direction (front-rear direction, that is, direction substantially orthogonal to the opening direction of the holder 38a) in the usage state after coupling the end 38. This restricts separation of the end 38 from the rear cable coupling portion 26A.

The front pulley 17, the rear pulley 18, and the peripheral structure of the front pulley 17 and the rear pulley 18 will now be described.

Figure 3:
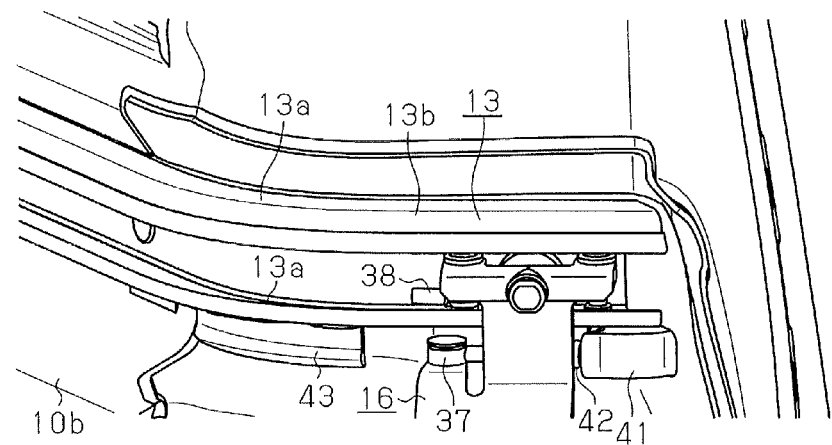
FIG. 3 is a perspective view showing a front side of a center rail and the peripheral structure of the center rail.

As shown in FIG. 3, a front case 41, which is formed from, for example, a resin, is fastened to the quarter panel 10b in conformance with the front end of the center rail 13, and a grommet 42, which is formed from, for example, a resin, is fitted to the front case 41 immediately below the center rail 13. The front case 41 rotationally accommodates the front pulley 17, and the grommet 42 guides the front cable 33 (closing operation cable portion 33A), which is directed toward the rear after changing directions at the front pulley 17 in the front case 41, to the lower side of the center rail 13, that is, the exterior of the vehicle.

An arcuate cable guide 43, which is formed from, for example, a resin, is fixed to the quarter panel 10b in conformance with the curved portion 13a of the center rail 13 immediately below the curved portion 13a. The cable guide 43 restricts contact of the closing operation cable portion 33A, which extends at the lower side of the center rail 13 in conformance with the shape of the center rail 13 including the curved portion 13a, with the quarter panel 10b. That is, the closing operation cable portion 33A slides along and contacts the cable guide 43 to change directions at the curved portion 13a without contacting the quarter panel 10b.

Figure 4:
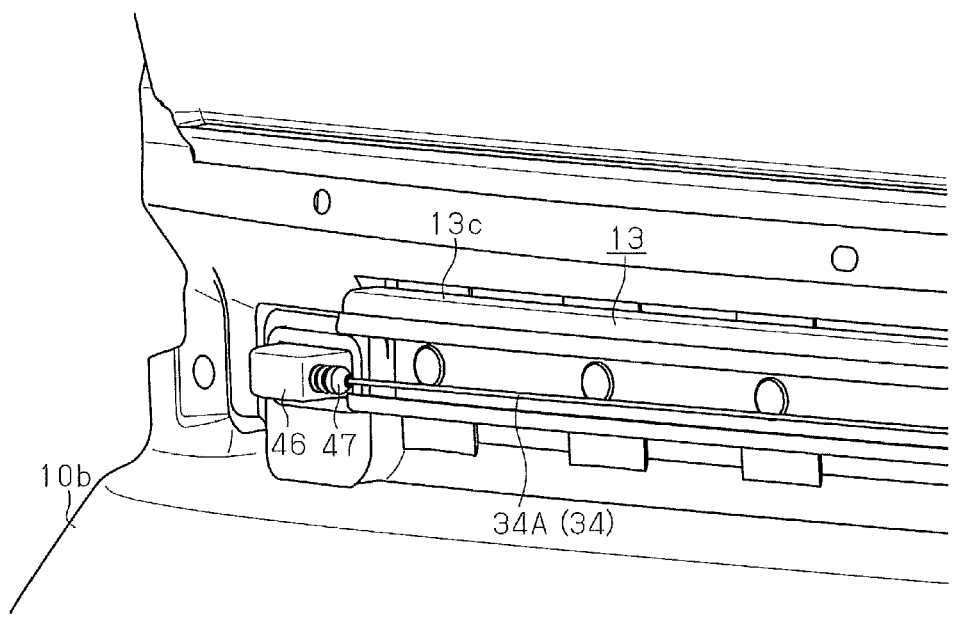
FIG. 4 is a perspective view showing a rear side of the center rail and a peripheral structure of the center rail.

As shown in FIG. 4, a rear side case 46, which is formed from, for example, a resin, is fastened to the quarter panel 10b facing the rear end of the straight portion 13c of the center rail 13 at the rear of the straight portion 13c. A grommet 47, which is formed from, for example, resin, is fitted to the rear side case 46. The rear side case 46 rotationally accommodates the rear pulley 18, and the grommet 47 guides the rear cable 34 (opening operation cable portion 34A), which is directed toward the front after changing directions at the rear pulley 18 in the rear side case 46, to the interior of the center rail 13, that is, the exterior of the vehicle.

The operation of the vehicle door opening/closing device will now be described.

First, when the drum 32 is rotated and driven in a forward direction by the drive motor 31, the front cable 33 is wound and the rear cable 34 is unwound. This moves the guide roller unit 16, which is coupled to the end 37, toward the front along the center rail 13, and the sliding door 20, which is coupled to the guide roller unit 16, is integrally moved toward the front. That is, the closing operation is performed. The end 37 is coupled to the guide roller unit 16 at the rear (front cable coupling portion 28) of the load roller 22. This accordingly separates the end 37 and the front cable coupling portion 28 at the fully-closed position from the front pulley 17. Thus, a sufficient clearance between the end 37 of the closing operation cable portion 33A and the front pulley 17 is obtained without increasing the amount bulged into the passenger compartment of the area accommodating the front pulley 17 at the front side of the inclined portion 13b of the center rail 13.

When the drum 32 is rotated and driven in the reverse direction by the drive motor 31, the rear cable 34 is wound and the front cable 33 is unwound. This moves the guide roller unit 16, which is coupled to the end 38, toward the rear along the center rail 13, and the sliding door 20, which is coupled to the guide roller unit 16, is integrally moved toward the rear. That is, the opening operation is performed.

As described in detail above, the present embodiment has the following effects.

(1) The closing operation cable portion 33A of the front cable 33 is located at the outer side and the lower side of the center rail 13, and the end 37 is coupled to the front cable coupling portion 28 of the guide roller unit 16 at the rear of the load roller 22. Accordingly, the end 37 of the closing operation cable portion 33A and the front cable coupling portion 28 at the fully closed position are separated from the front pulley 17, which is located at the front of the end 37. Thus, a sufficient clearance is obtained between the end 37 of the closing operation cable portion 33A and the front pulley 17 without increasing the amount bulged into the passenger compartment of the area accommodating the front pulley 17 at the front side of the inclined portion 13b of the center rail 13. This limits reduction of the space in the passenger compartment and limits deterioration in the appearance of the trimming 50. Further, in a vehicle including three rows of seats such as a van, a minivan, and the like, the ease to enter and exit the vehicle from the seat in the third row is unaffected.

(2) The end 37 of the closing operation cable portion 33A is arranged proximate to the end 38 of the opening operation cable portion 34A as viewed from above. Accordingly, the two ends 37 and 38 of the closing operation cable portion 33A and the opening operation cable portion 34A, as well as the front cable coupling portion 28 and the rear cable coupling portion 26A are arranged in a concentrated manner. This allows for the guide roller unit 16 including the base plate 21 to be further reduced in size as viewed from above.

(3) The end 38 of the opening operation cable portion 34A is coupled to the guide roller unit 16 from the extending direction of the rear cable 34 (opening operation cable portion 34A), which extends to the end 38, that is, a direction (vehicle widthwise direction) that differs from the direction in which tension acts on the rear cable 34. This improves the ease for coupling the rear cable 34.

In the same manner, the end 37 of the closing operation cable portion 33A is coupled to the guide roller unit 16 from the extending direction of the front cable 33 (closing operation cable portion 33A), which extends to the end 37, that is, a direction (vehicle vertical direction) that differs from the direction in which tension acts on the front cable 33. This improves the ease for coupling the front cable 33.

(4) The rear cable coupling portion 26A, to which the end 38 of the opening operation cable portion 34A is coupled, is coaxial with the rear vertical roller 23. Accordingly, the rear cable coupling portion 26A and the vertical roller 23 are arranged in a concentrated manner. This allows the guide roller unit 16 including the base plate 21 to be further reduced in size as viewed from above. In particular, the number of components may be reduced since the support pin 25 of the vertical roller 23 is integrally formed with the rear cable coupling portion 26A.

(5) The rear cable coupling portion 26A is inserted into and received in the separation stopper 38b, which is fitted into the holder 38a of the end 38, so that the end 38 is not separated from the rear cable coupling portion 26A.

(6) The cable guide 43 is arranged in conformance with the curved portion 13a of the center rail 13. This allows for a reduction in the consumed amount of material compared to, for example, when the cable guide extends over the entire length of the center rail 13.

The present embodiment may be modified as described below.

The separation stopper 38b of the end 38 may be formed from metal.

The end 37 of the front cable 33 may be formed by a holder and a separation stopper like the end 38 of the rear cable 34. Alternatively, the end 38 of the rear cable 34 may be formed like the end 37 of the front cable 33.

At least one of the ends 37 and 38 may be hook-shaped. Further, the ends 37 and 38 may have any shape as long as the ends can be coupled to the guide roller unit 16. For example, the ends 37 and 38 may be shaped so that they are coupled to the guide roller unit 16 by pulling the ends 37 and 38 in the direction in which tension acts on the closing operation cable portion 33A or the opening operation cable portion 34A.

The rear cable coupling portion 26A, to which the end 38 of the opening operation cable portion 34A is coupled, does not have to be coaxial with the rear vertical roller 23.

The end 37 of the closing operation cable portion 33A does not necessarily have to partially overlap the opening operation cable portion 34A as long as closing operation cable portion 33A is arranged proximate to the end 38 of the opening operation cable portion 34A as viewed from above.

The closing operation cable portion 33A of the front cable 33 may be arranged at the upper side of the center rail 13.

Two cables, the front cable 33 and the rear cable 34, are used. Instead, a single cable may be used. In this case, one end of the cable corresponds to the end 37, and the other end corresponds to the end 38.

The invention claimed is:

1. A device for opening and closing a vehicle door comprising:
   a guide rail configured to be arranged on a quarter panel at a rear side of a door opening formed in a side portion of a vehicle body, wherein the guide rail is configured to extend in a front-rear direction and includes an inclined portion on a front end, and the inclined portion is configured to be inclined toward a vehicle interior, wherein the guide rail possesses a cross-sectional shape that is open toward a vehicle exterior and the vehicle door when the guide rail is arranged on the quarter panel;
   a guide roller member configured to be coupled to the vehicle door that opens and closes the door opening, wherein the guide roller member includes a roller that can roll on the guide rail;
   a drive member configured to be fixed to the vehicle body, wherein the drive member includes a drive source and a drum that is rotated and driven by the drive source;
   a front pulley and a rear pulley located at a front side and a rear side of the guide rail;
   a cable wound around the drum and running along the front pulley and the rear pulley to change directions, wherein the cable includes two ends that are each coupled to the guide roller member;
   wherein the front pulley is located above or below the guide rail;
   wherein a closing operation cable portion, which is a portion of the cable extending from the front pulley to the guide roller member, is located above or below the guide rail, and a corresponding one of the ends is coupled to the guide roller member at a rear of the roller; and
   wherein an opening operation cable portion, which is a portion of the cable extending from the rear pulley to the guide roller member, is located in the guide rail, and a corresponding other one of the ends is coupled to the guide roller member.

2. The device according to claim 1, wherein the end of the closing operation cable portion is located proximate to the end of the opening operation cable portion as viewed from above.

3. The device according to claim 1, wherein
   the end of at least one of the closing operation cable portion and the opening operation cable portion is coupled to the guide roller member from a direction that differs from a direction in which the cable extends to the end of the at least one of the closing operation cable portion and the opening operation cable portion.

4. The device according to claim 3, wherein the end of the at least one of the closing operation cable portion and the opening operation cable portion includes:
   a holder open toward the vehicle interior; and
   a separation stopper fitted into the holder, wherein a coupling portion of the guide roller member to which the end is coupled is inserted and fitted into the separation stopper.

5. The device according to claim 1, wherein
   the guide roller member includes two guide rollers arranged in the front-rear direction on opposite sides of the roller, wherein the guide rollers can roll on the guide rail and rotate about axes extending in a vertical direction of the vehicle; and
   the end of the opening operation cable portion is coupled to a coupling portion of the guide roller member, wherein the coupling portion is arranged coaxially with the rear guide roller.

* * * * *